Horst Bachmann
INVENTOR.

BY Karl J. Ross
Attorney

United States Patent Office 3,347,081
Patented Oct. 17, 1967

3,347,081
APPARATUS FOR THE HEADING OF
ELONGATED WORKPIECES
Horst Bachmann, Haan, Rhineland, Germany, assignor to
Maschinenfabrik Hasenclever AG, Dusseldorf, Germany, a corporation of Germany
Filed Aug. 24, 1965, Ser. No. 482,231
15 Claims. (Cl. 72—342)

My present invention relates to the transverse deformation of elongated workpieces, generally at regions distal from the extremities of the workpiece, by the localized heating thereof at these intermediate regions and the application of inward pressure in the direction of the major dimension of the body.

Heading and "upsetting" operations using heading presses have been carried out heretofore upon elongated workpieces in such manner as to form the enlargement or "head" either at one extremity of the workpiece or at a region intermediate the extremities thereof. In principle, presses and forges for heading operations are designed to apply endwise pressure to a workpiece which has been heated in the region of deformation to its plastic-deformability temperature at the pressure applied. As the pressure is applied, there is a tendency for the workpiece to bulge or enlarge transversely to the direction of the applied force to form a head or flange which can be shaped by confining the heated portion of the work in a die during the heading operation.

The use of electrical heating methods to bring the workpiece to the temperature of plastic deformation has also been previously proposed, the usual electrical-heating system having supports for the extremities of the workpiece which simultaneously serve as electrodes. The heating is accomplished by the joule or resistive energy resulting from the passing of the electric current through the workpiece between the electrodes. When these latter systems are applied to workpieces which are to be provided with enlargements or heads at intermediate locations therealong, i.e., locations remote from the extremities of the workpiece and of a length which is proportionally small when compared with the axial length of the portions of the workpiece extending from the head, considerable difficulties are encountered. For example, it was observed fairly early that it was necessary to provide an anvil member to shape the transition zone between the head and the corresponding extremity if distortions were not to be experienced. Thus, the die of an upsetting or heading press was generally provided with an annular anvil member which also served as an electrode for the supply of heating current to the workpiece. The die of the press consequently included one of the electrodes while the other was affixed to the workpiece externally of the die.

In the use of presses of this type, it has long been the desire to permit transfer of the electric current from the electrode to the workpiece without the formation of scales, burrs, spark pitting and the like by ensuring a good electrical contact between the workpiece and the electrode. In the absence of such contact and, for the most part, with conventional presses, there was a noticeable overheating of the workpiece in the transition zones between the head regions and the ends thereof and the transfer zones at which electric current was applied to the workpiece. The conventional systems have been able to solve the main problem of burr-free heating of the workpiece only to a limited extent. When, for example, it was proposed to dispose an anvil about a workpiece and to improve the electrical contact by connecting the anvil with a source of electrical current, success also was not attained because the apparatus could not readily be adapted to workpieces with wide ranges of physical size. If, for example, the workpiece was relatively small, it was impossible to ensure good electrical conductivity between the anvil member and the workpiece. As a practical matter, it was found that only unusually small deviations in the dimensions of the workpiece could be accommodated and that the small deviations had an upper limit of about 0.03 mm. It has not been possible, therefore, to treat workpieces having a relatively large variation in dimensions, i.e. manufactured with large tolerances, while carrying out the heating operation in such manner as to prevent the formation of burrs and other defects.

It is, therefore, the principal object of the present invention to provide a die assembly for an upsetting or heading press of the character described with all accommodated workpieces having a wide range of dimensions and tolerances but which all nevertheless provide an unobjectionable electric contact between the electrode and the workpiece.

Another object of my present invention is to provide an electrode assembly for a heading apparatus which permits movement of a workpiece within the die-forming press member and electrical transfer without the development of scale, pitting or burring and which prevents overheating of the workpiece at the junctions between the head and the extremities of the workpiece.

Still another object of the invention is to provide an improved heading press for the transverse deformation of elongated and finished or semifinished workpieces without requiring aftertreatment thereof or rectification of the head or transition zones.

The above and other objects which will become apparent hereinafter are attained, in accordance with the present invention, by an electrode-forming die assembly for an electric heading press or the like which comprises a generally closed die-forming portion and an electrode portion axially aligned with the die-forming portion and provided with a pair of relatively displaceable clamping members shiftable transversely to the major dimension of the elongated workpiece; in accordance with an important aspect of the present invention, the assembly comprises a contact sleeve longitudinally subdivided so as to be yieldable in transverse direction upon closure of the clamping members of the electrode holder, the sleeve receiving the elongated workpiece to be subjected to the heading operation. The sleeve, which provides the exclusive or at least primary supply of electric current to the workpiece, is coaxial with the die cavity of the die-forming portion and with an annular anvil member; the latter is advantageously secured to the sleeve at the extremity thereof proximal to the die cavity.

The present improvement is based upon my discovery that the defective workpieces resulting from earlier systems and the inability of such systems to accommodate workpieces of different diameters was a consequence of the fact that the anvil member constituted the sole or primary means of supplying the heating current to the workpiece. Accordingly, the anvil member of the present invention is so constructed and arranged that it supplies little, if any, heating current to the workpiece, while the heating current is supplied substantially entirely by the yieldable contact sleeve. The combination of this contact sleeve, which is axially shiftable in the electrode holder, and the clamping members of the latter accommodate the assembly to workpieces of substantially all diameters or to workpieces of similar diameters having a wide variation in actual size as a consequence of large manufacturing tolerances. Since the clamping means of the electrode holder urge the contact sleeve against the workpiece over an axially extending region thereof, excessive heating of the workpiece in limited regions is avoided.

As previously noted, it is a feature of the present invention that the contact sleeve serves as an axially yieldable abutment or support for the anvil member. At the extremity of the contact sleeve, remote from the anvil member and the die cavity, I advantageously provide a pressure-receiving mandrel or pin by means of which axial shifting of the contact sleeve and the workpiece received thereby is regulated.

While the means whereby the current supply to the workpiece by the contact sleeve is maintained in excess to that supplied by the anvil member can be of various forms, it is to provide the anvil member of a material whose conductivity is substantially less than that of the contact sleeve. Additionally or alternately, a layer of electrically insulating material can be disposed between the contact sleeve and the anvil member. When an anvil member of limited conductivity is used, I prefer to make it from a refractory nonmetal such as a ceramic. According to still another feature of the present invention, the contact sleeve is provided with an internal bore of a diameter in excess of that of the workpiece and the anvil member, even in a radially compressed position of the contact sleeve, to further ensure a proper supply of electric current to the workpiece in the region immediately beyond the anvil. The large-diameter portion of the sleeve thus commences at a distance from the anvil equal to several diameters of the workpiece prior to the heading operation. In the region immediately proximal to the anvil, however, the inner diameter of the contact sleeve is such as to enable the latter to hug the workpiece closely. One of the clamping members of the electrode can be swingably or linearly reciprocable relative to the other by hydraulic means, for example, to release and clamp the contact sleeve. An arrangement of the aforedescribed type has been found to produce headed prefinished workpieces which do not require further treatment and which are free from burrs, scales and electrical pitting; moreover, localized overheating of the workpieces in the transition zones is avoided and the apparatus can accommodate workpieces of a wide range of sizes.

The above and other objects, features and advantages will become more readily apparent from the following description, reference being made to the accompanying drawing in which.

Figure 1:
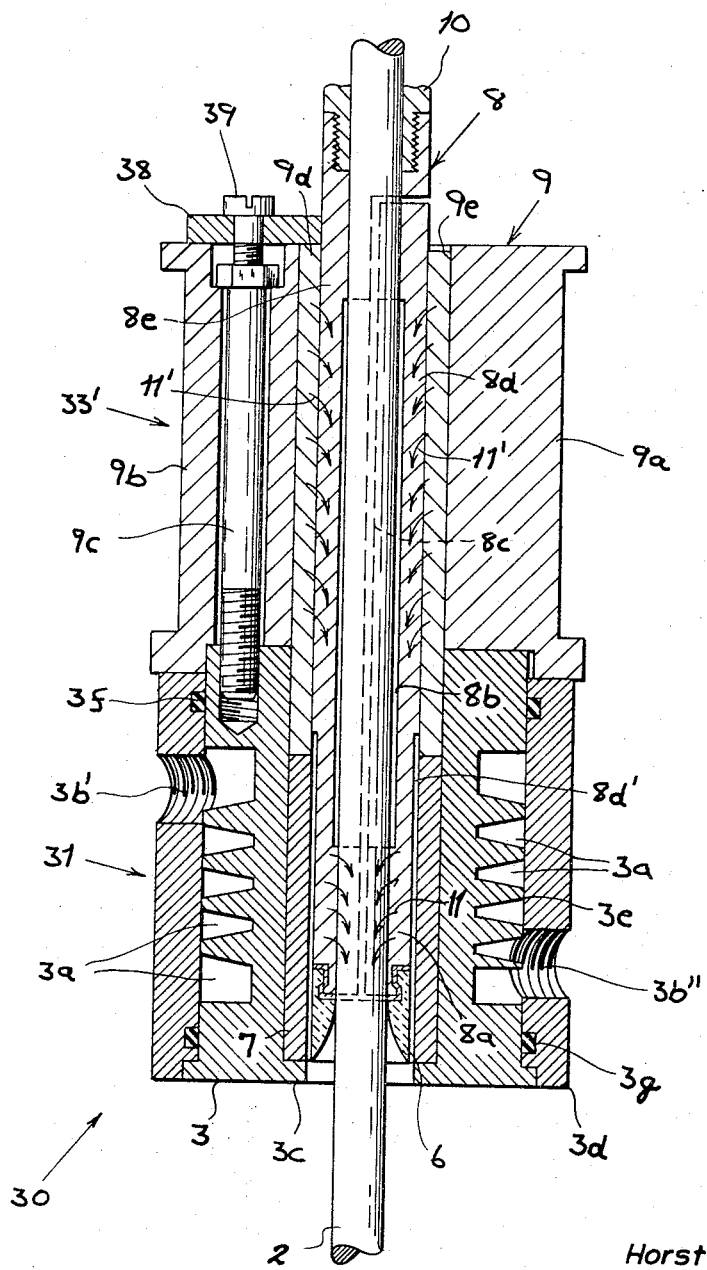
FIG. 1 is an axial cross-sectional view through the die portion of an electrical heading apparatus, according to the present invention, with the relatively movable parts in their initial operating positions.
Figure 2:
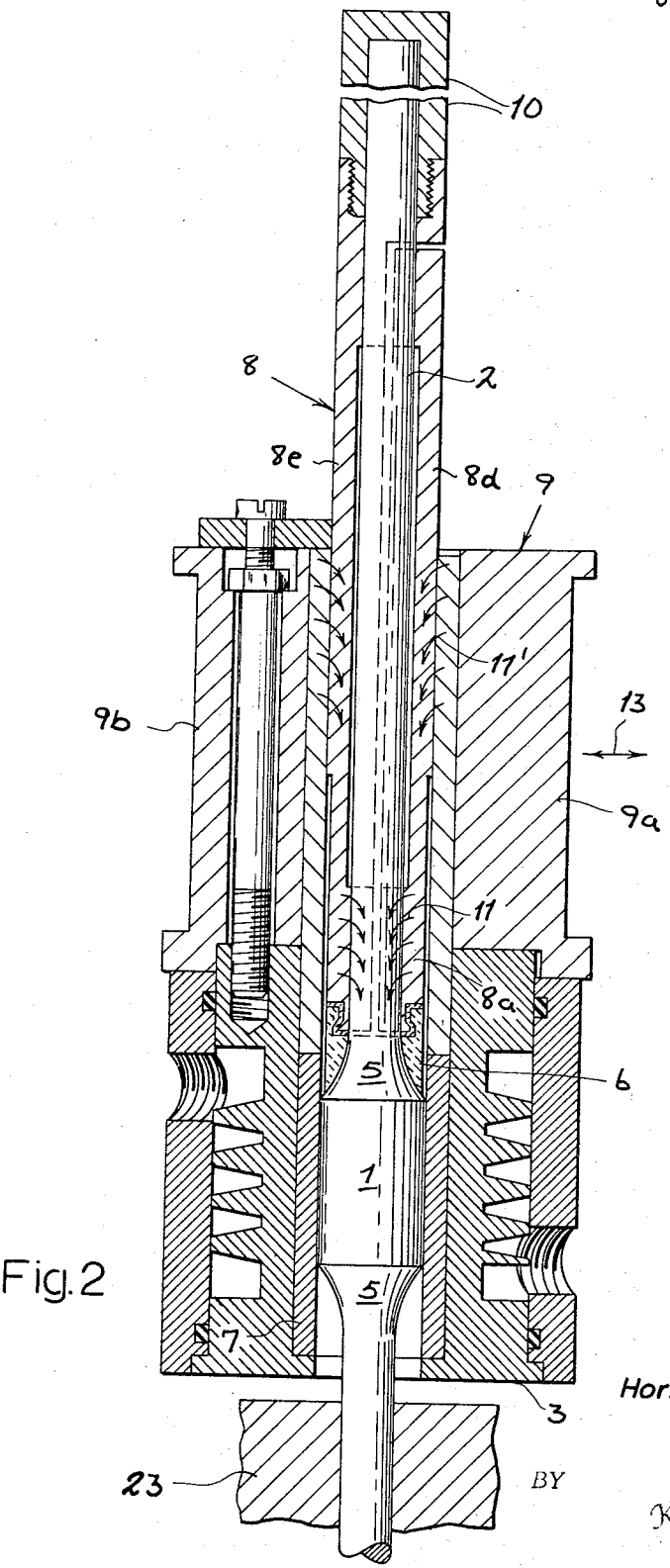
FIG. 2 is a cross-sectional view similar to FIG. 1 but with the parts in their end position at the conclusion of the heading operation.
Figure 3:
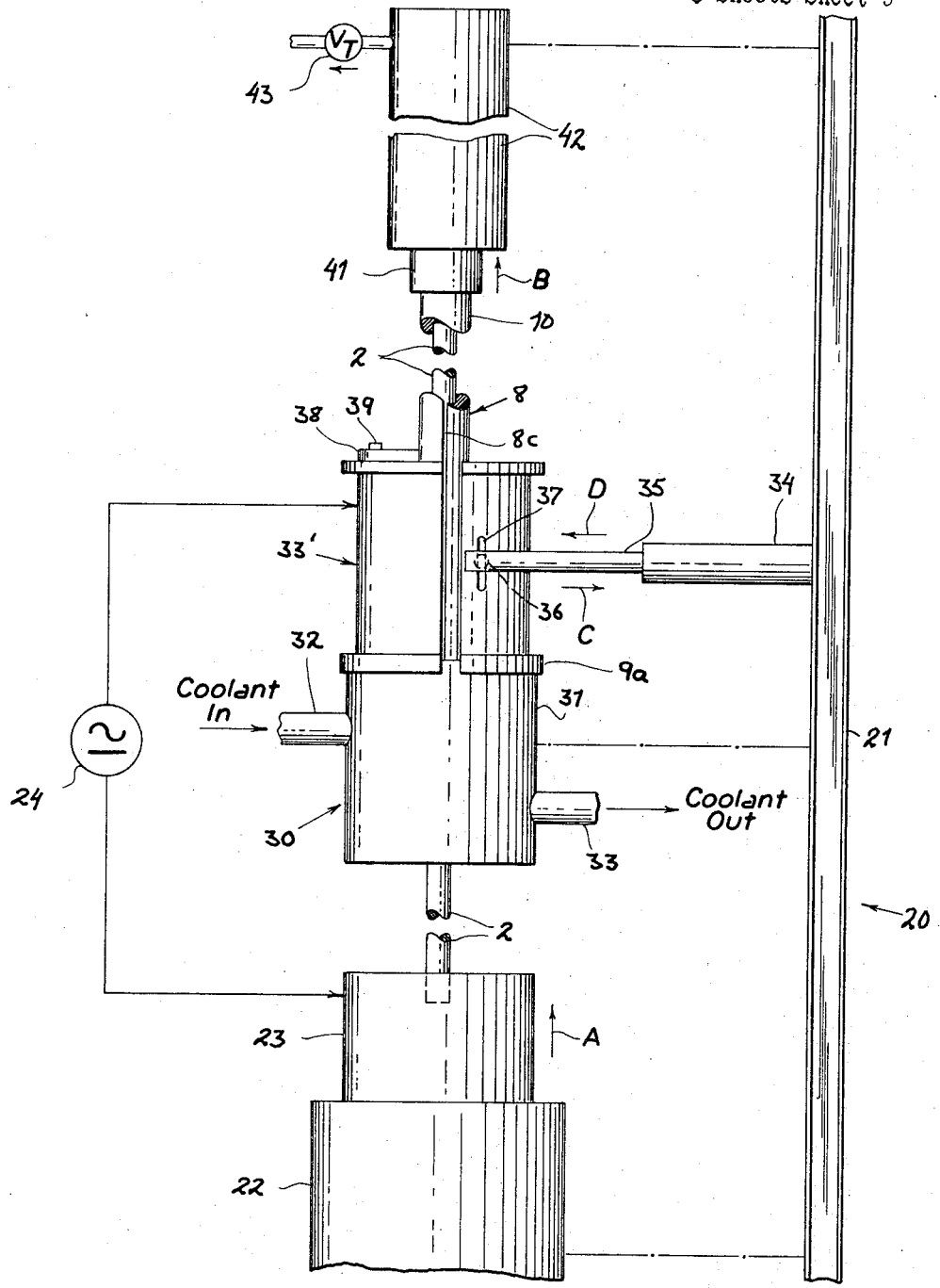
FIG. 3 is an elevational view of a heading press diagrammatically illustrating how the assembly of FIGS. 1 and 2 can be employed in such press.

Referring first to FIG. 3, it will be seen that a heading press 20 can comprise a support frame 21 upon which the die assembly of FIGS. 1 and 2, and generally designated 30, is mounted. A hydraulic cylinder 22 slidably receives a piston or ramp 23 which serves to apply pressure in the direction of arrow A upon a workpiece 2 recessed in the piston 23 which also serves as one of the electrodes connected to a resistive-heating source 24 of electric current. As will be apparent hereinafter, the assembly 30 comprises a lower die member 31 surrounding the workpiece 2 in the region 1 thereof to be transversely enlarged by compression from ramp 23. An inlet 32 and an outlet 33 supply a cooling fluid 2 and remove it from the region of the die. The upper portion 33 of the assembly constitutes an electrode holder 9 which is connected with the current source 24. The means for swinging the movable clamping member of the electrode holder 9 can include a hydraulic cylinder 34 whose piston 35 has a ball 36 received with universal movement within an axially extending slot 37 of the swingable portion 9a of the electrode holder. The swingable portion 9a is provided with a lug 38 through which a pivot pin 39 passes to permit swinging movement of the clamping member 9a. The longitudinally split contact sleeve 8, best seen in FIGS. 1 and 2, extends upwardly beyond the electrode 33 and is provided with a pressure mandrel 10 which bears upon the piston 41 of a hydraulic cylinder 42, the latter is provided with a throttle valve 43 which determines the rate of movement of the mandrel 10, the contact sleeve 8 and the workpiece 2 in the direction of arrow B as the ramp 23 advances. In operation, the resistive heating current from source 24 passes through a limited region of the workpiece 2 within the lower portion 31 of the die assembly 30, thereby heating this region of the workpiece to its plastic-deformation temperature. The piston 23 is hydraulically operated to provide a shaping force in the direction of arrow A while the piston 41 and its cylinder 42 resists displacement in this direction except at a rate slower than that of piston 23 so that, advantageously, the difference in rates corresponds to the rate of softening of the workpiece and its desired deformation. The sleeve 8 and the workpiece 2 gradually travel along the assembly while the workpiece expands at 1 against the similarly moving anvil member to the lateral dimensions determined by the die cavity with the anvil member 6 defining the shape of the transition zone 5. At the conclusion of the heading operation, cylinder 34 is actuated and piston 35 draws the clamping member 9a of the holder in the direction of arrow C to its open position illustrated in FIG. 3. The workpiece can then be removed. When a new workpiece is inserted, hydraulic pressure in the direction of arrow D closes the clamping member 9a and thereby clamps the sleeve 8 against the workpiece regardless of any deviations in diameter from one workpiece to another.

The die-forming assembly 30 illustrated with the workpiece in its extreme positions in FIGS. 1 and 2, will be seen to comprise a unitary or undivided die holder 3 whose shoulder 3c forms a lower abutment for a die 7 in the form of a sleeve. The die holder 3 is surrounded by a jacket 3d which closely hugs a helical rib 3e of the holder 3 to define a continuous cooling channel 3a between the jacket 3d and the die holder 3, the inlet 32 communicates with an aperture 3b' while outlet 33 communicates with an aperture 3b'' for supplying the cooling fluid to and removing it from the channels 3a surrounding the die holder 3, a pair of annular seals 3f and 3g prevent the escape of cooling fluid between the jacket 3d and the die holder 3.

The upper portion 33 of the assembly is constituted by an electrode holder 9 having a fixed clamping member 9b secured by a bolt 9c to the die holder 3. The swingable clamping member 9a, which can be shifted in the direction of arrow 13 by the hydraulic means 34, 35, etc., has the lug 38 which is swingably connected via pin 39 with the bolt 9c and thus with the stationary electrode member 9a. The electrode holder 9 is thus bipartite and can serve to clamp the split contact sleeve 8 against the workpiece 2 or to release the contact sleeve and the workpiece. The clamping members 9a and 9b are formed with respective cylindrical segmental liners 9d and 9e of a material of high electrical conductivity but low coefficient of sliding friction to provide efficient transfer of current to the sleeve 8. The latter is longitudinally split as illustrated at 8c to provide the separable portions 8d and 8e which can be clamped together by members 9a and 9b. An anvil member 6 of ceramic material is affixed at one end to the sleeve 8 and thus holds the separable parts of the sleeve at this end together. On insulating layer 6a is provided between the anvil 6 and the sleeve 8 and may likewise be composed of a ceramic material.

The anvil 6 has, of course, a conductivity less than that of the metallic sleeve 8. At this extremity, remote from the anvil 6, the sleeve 8 is provided with the pressure-receiving mandrel or stub 10 whose purpose has been described above. It will be apparent that the sleeve 8 has a small-diameter portion 8a in the immediate region of the anvil 6 at which a positive transfer of electric current to the workpiece 2 is effected, as indicated by arrows 11. Beyond this small-diameter portion, however, the diameter of the contact sleeve bore increases, as indicated at 8b so that current transfer to the workpiece is restricted to the region 8a. Moreover, the sleeve 8 is designed to contact the electrode members 9a and 9b via their linings 9e and 9d in the region corresponding to the inner region 8b of the sleeve 8 so that transfer of electric current to the sleeve, as indicated by arrows 11, can be effected without difficulty. In the region corresponding to the small-diameter portion 8a, the periphery of sleeve 8 is recessed, as seen at 8d, to limit current flow between the electrode holder and the contact sleeve to the upper portion thereof. This current transfer is shown by arrows 11'. The outer diameter of the anvil member is substantially identical with that of the sleeve 8 in the region 8d.

The invention as described and illustrated is believed to admit of any modifications within the ability of persons skilled in the art, all such modifications being considered within the spirit and scope of the appended claims.

I claim:

1. A die assembly for a heading press wherein an elongated workpiece is subjected to localized electrical heating and compression for transverse enlargement of the workpiece in the heated region thereof, said assembly comprising a die-forming member provided with a die cavity for receiving said workpiece; an annular anvil member received in and coaxial with said cavity and adapted to surround said workpiece; a longitudinally split electrically conductive contact sleeve coaxial with and connected to said anvil member and adapted to surround said workpiece beyond said anvil member while being yieldable transversely to said workpiece for clamping engagement therewith; and electrically conductive electrode-holder means connected with said die-forming member and having a pair of clamping members relatively shiftable transversely to said workpiece for clamping said sleeve thereagainst while permitting axial displacement of said sleeve and the workpiece enclosed thereby with respect to said die-forming member, thereby permitting transfer of electric current from said clamping members to said sleeve and from said sleeve to the workpiece.

2. An assembly as defined in claim 1 wherein said sleeve is connected at one of its extremities with said anvil member and is provided with a pressure-receiving stud at its other extremity.

3. An assembly as defined in claim 1 wherein said anvil member is composed of a material of an electrical conductivity substantially less than that of said sleeve.

4. An assembly as defined in claim 3 wherein said anvil member is composed of a ceramic material.

5. An assembly as defined in claim 1, further comprising a layer of an electrically insulating material disposed between said anvil member and said sleeve.

6. An assembly as defined in claim 5 wherein said layer is composed of a ceramic.

7. An assembly as defined in claim 1 wherein said contact sleeve bears against said workpiece only over a limited axial region proximal to said anvil member.

8. An assembly as defined in claim 7 wherein said contact sleeve bears against said clamping members only over a limited axial region distal from said anvil members.

9. An assembly as defined in claim 8 wherein said anvil member and said contact sleeve have substantially equal diameters less than that of said cavity at the end of said sleeve within said cavity.

10. An assembly as defined in claim 1, further comprising hydraulic means for relatively displacing said clamping members to engage and release said workpiece.

11. An assembly as defined in claim 1 wherein said die-forming member comprises a cylindrical body formed with a helical rib and a jacket surrounding said body and hugging said rib so as to define therewith an annular cooling channel surrounding said cavity, said assembly further comprising means for supplying a cooling fluid to and removing said fluid from said cooling channel.

12. An assembly as defined in claim 11 wherein said cavity is provided in a sleeve received in said body.

13. An assembly as defined in claim 12 wherein at least one of said clamping members is fixed to said body and the other of said clamping members is swingably mounted on said one of said clamping members.

14. An assembly as defined in claim 13 wherein said clamping members are each formed with cylindrical segmental liners of high electrical conductivity and low coefficient of sliding friction for engagement with said sleeve.

15. In a heading press for the upsetting of an elongated workpiece to form a head thereon at a location intermediate the extremities of the workpiece, in combination:

a die assembly comprising a die-forming member provided with a die cavity for receiving said workpiece at said intermediate location, an annular anvil member received in said cavity coaxially therewith and surrounding said workpiece for shaping a transition zone of the latter between the workpiece head and one extremity of said workpiece, a longitudinally split electrically conductive contact sleeve surrounding said workpiece and secured at one extremity of said sleeve to said anvil member while having relatively deflectible members transversely compressible against said workpiece, and electrode-holder means secured to said die-forming member for clamping said sleeve against said workpiece while being electrically conductive for transfer of electric current to said sleeve, said sleeve being axially slidable within said electrode-holder means;

means forming an electrode in contact with said workpiece at the other extremity thereof on the side of said location opposite said anvil member;

a source of electric current connected across said electrode-holder means and said means forming an electrode for passing a heating current through said workpiece to raise the temperature thereof at said location to the temperature of plastic deformation of the workpiece material;

pressure means for displacing said one of said extremities of said workpiece forming an electrode in the direction of said assembly, thereby expanding said workpiece at said location to a size determined by said cavity and forming a transition zone between the expanded portion of the workpiece and the extremity thereof engaged by said sleeve; and means permitting movement of said sleeve and said extremity of the workpiece engaged thereby at a rate less than that of the other extremity of said workpiece.

References Cited

UNITED STATES PATENTS

| | | | |
|---|---|---|---|
| 126,495 | 5/1872 | Seward | 72—354 |
| 883,695 | 4/1908 | Canda | 72—342 |
| 2,581,774 | 1/1952 | Stone et al. | 72—342 |
| 2,836,706 | 5/1958 | Cavanagh | 72—342 |

CHARLES W. LANHAM, *Primary Examiner.*

L. A. LARSON, *Assistant Examiner.*